United States Patent Office 2,870,587
Patented Jan. 27, 1959

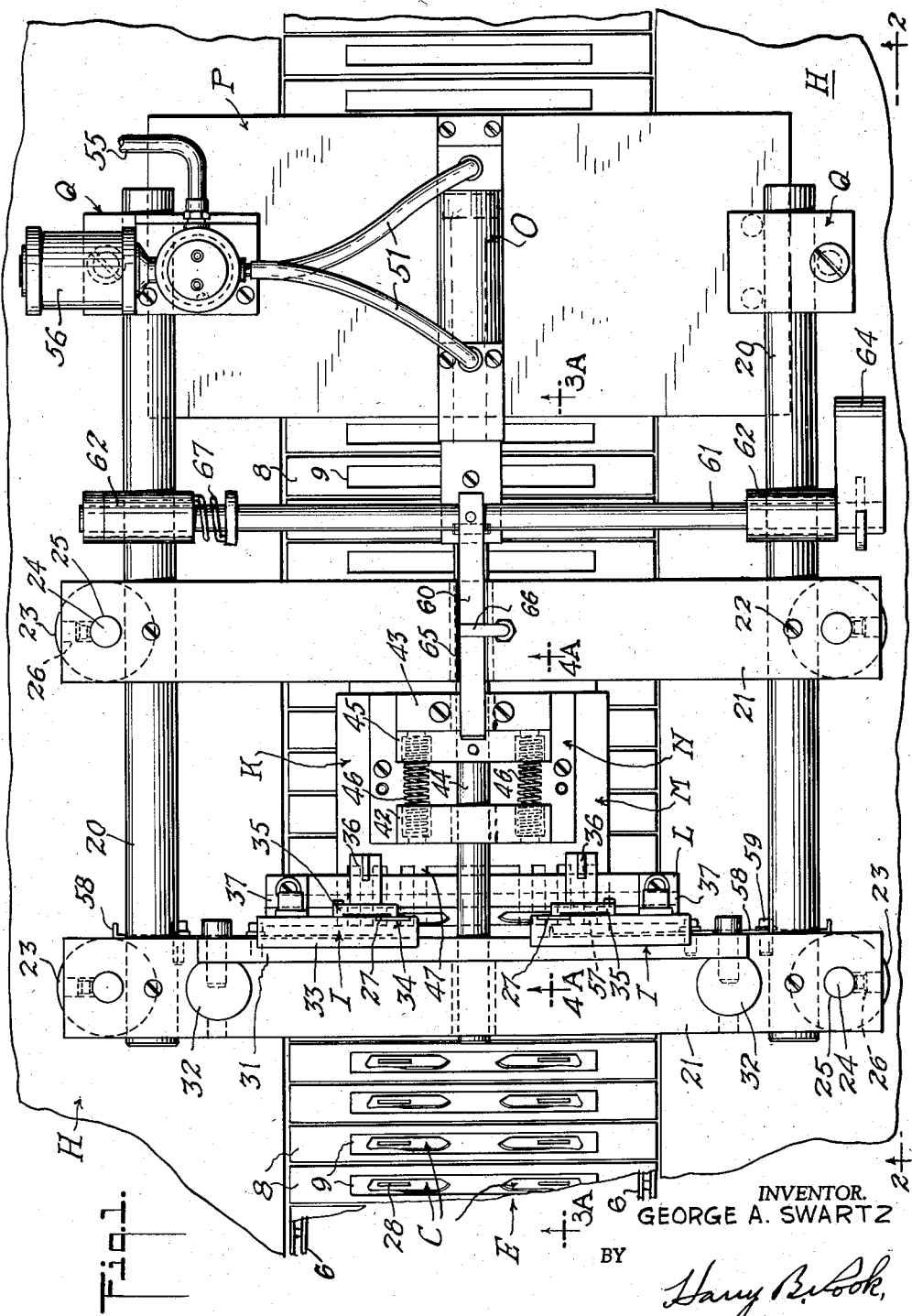

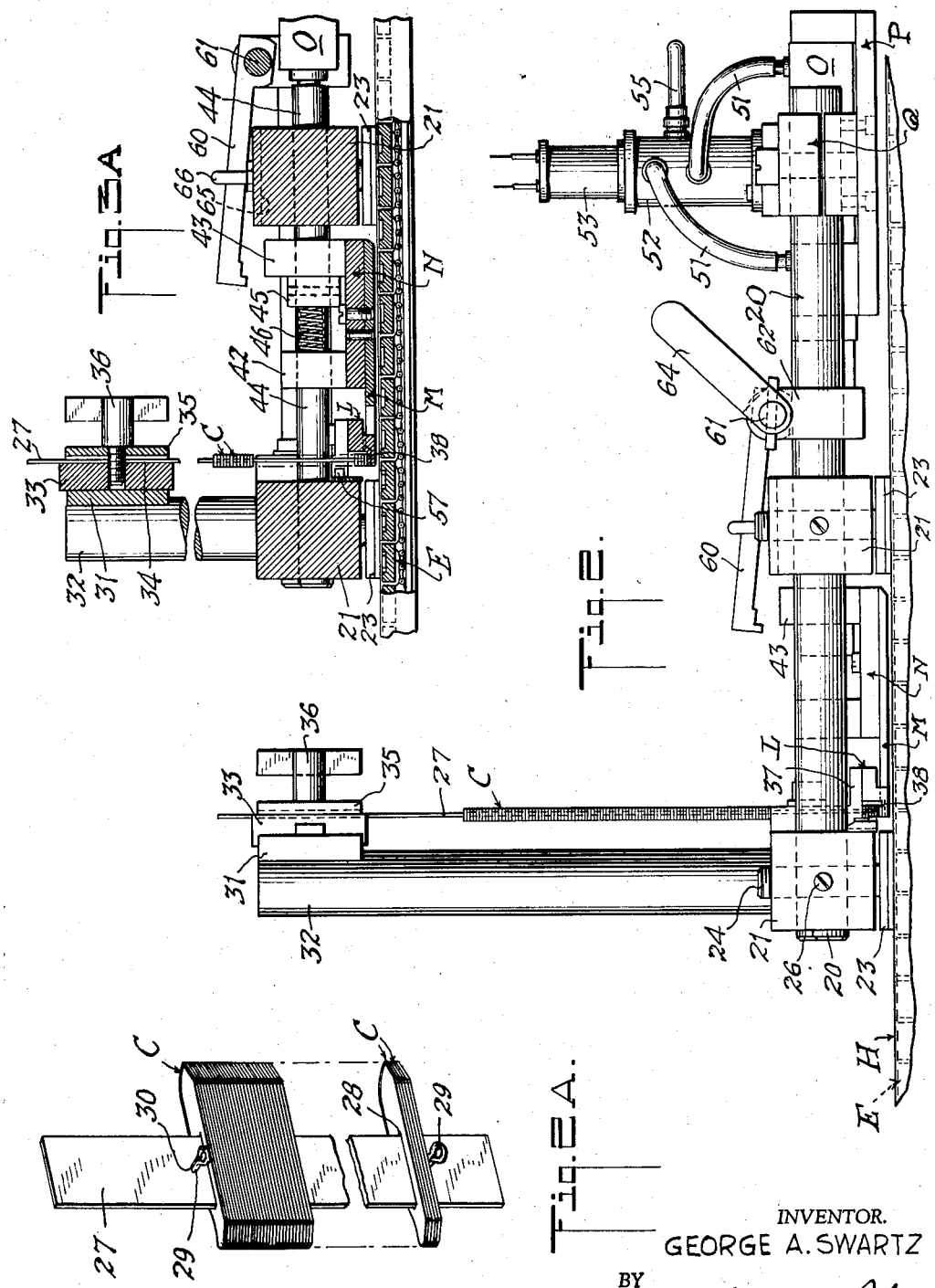

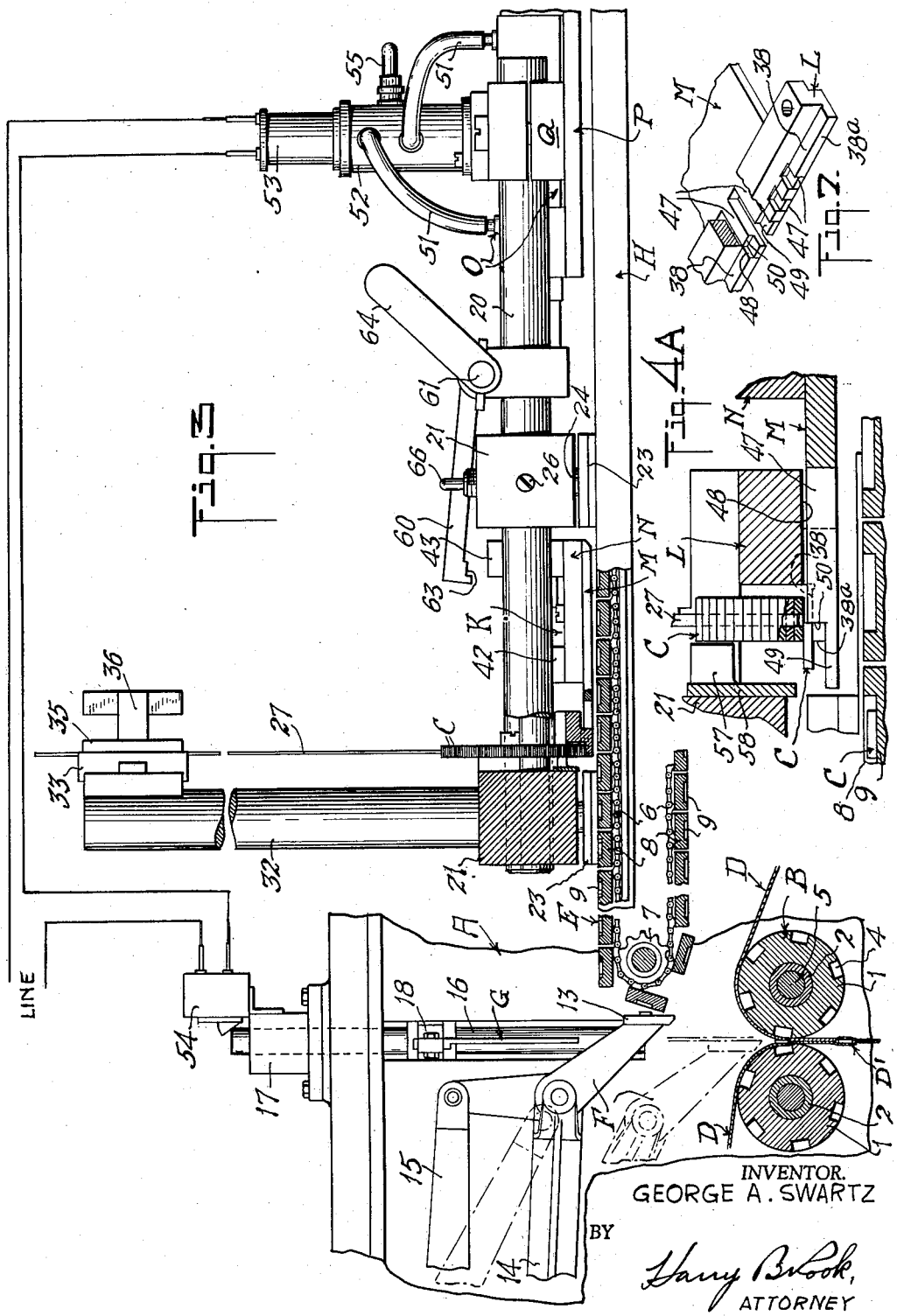

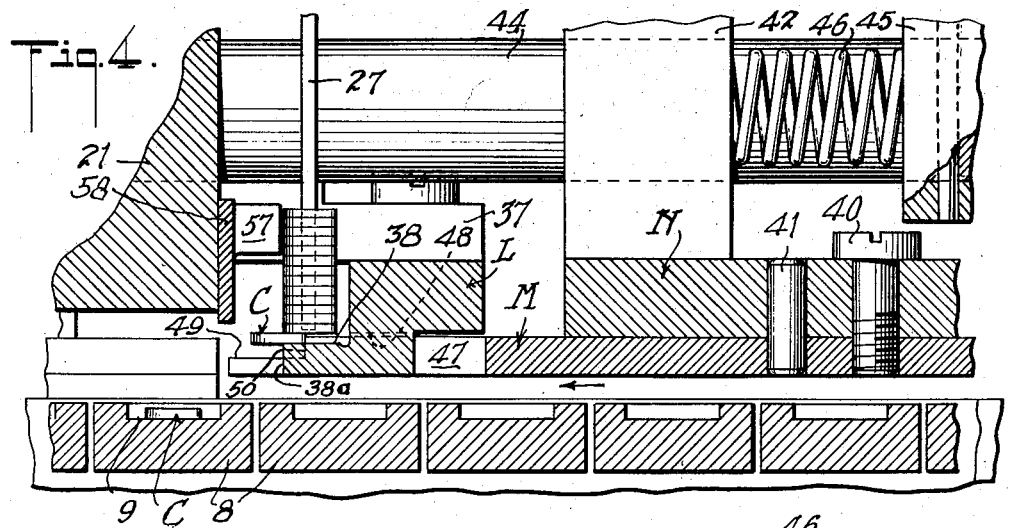
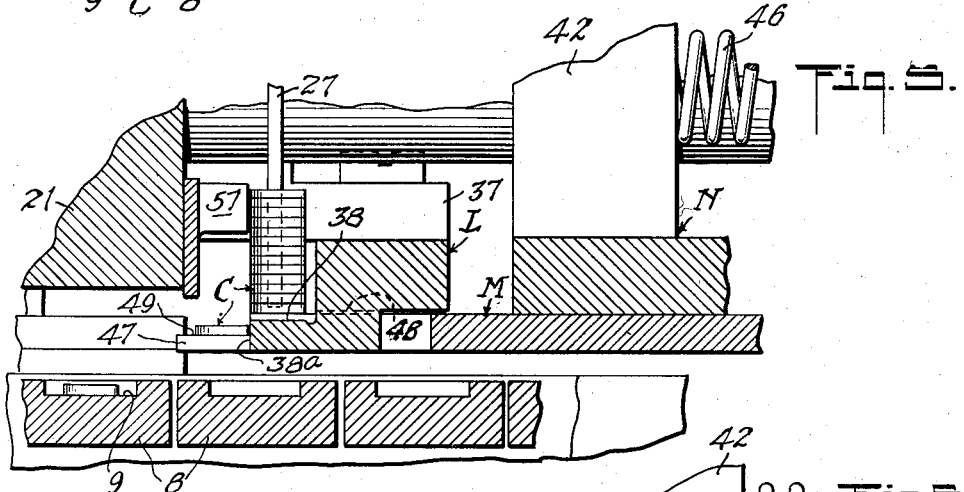
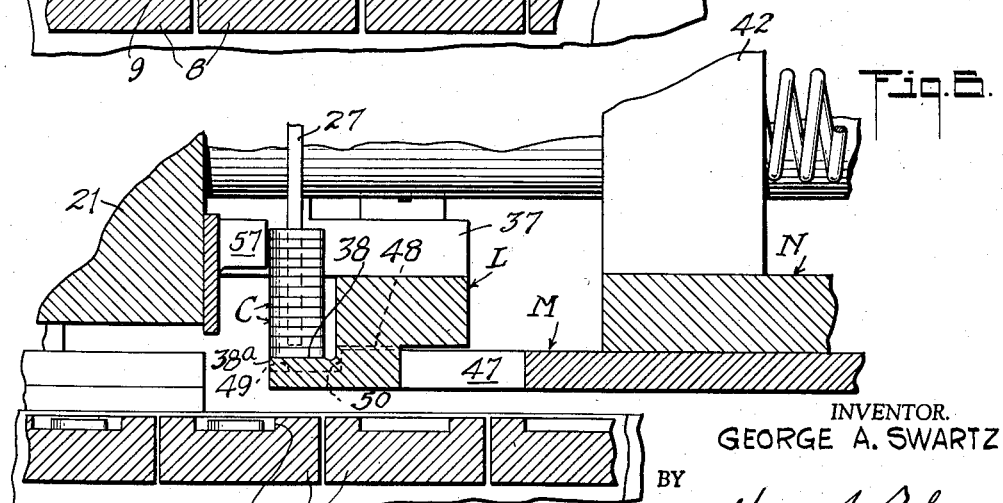

2,870,587

APPARATUS FOR FEEDING THIN ARTICLES TO PACKAGING MACHINES

George A. Swartz, Millington, N. J., assignor to Ivers-Lee Company, Newark, N. J., a corporation of Delaware Application July 25, 1958, Serial No. 750,973

10 Claims. (Cl. 53—180)

This invention relates in general to apparatus for feeding thin relatively stiff articles such as surgical blades to a predetermined point such as a machine for packaging blades; and more particularly the invention contemplates such blade feeding apparatus for use in conjunction with a packaging machine of the type disclosed in Patent No. 2,653,434 dated September 29, 1953, wherein two layers of flexible packaging material such as metal foil are drawn from supply rolls into juxtaposed closely spaced relation adjacent an article feeding and depositing mechanism which deposits the articles such as a surgical blade between the layers, after which the layers are sealed together around the articles in zones that form and bound pockets or compartments between the layers in which the articles are enclosed.

A machine such as described in said patent includes a conveyor for feeding articles to a predetermined point, a suction transfer head for transferring the articles in succession from said point to a position between said opposed layers of packaging material and a pusher reciprocable in timed relation to the movement of said transfer head to engage and follow said articles from the transfer head into position between the layers of packaging material.

A primary object of the present invention is to provide novel and improved apparatus for feeding and depositing the articles in succession, particularly surgical blades, on such a conveyor in timed relation to the movement of the conveyor and the transfer head.

Manifestly in the handling of such delicate and thin articles such as surgical blades, difficulty is encountered in arranging and holding a plurality of the articles in such a position that they may be individually and rapidly deposited on a travelling conveyor, and additional difficulty is encountered in individually separating such articles from a group so that the articles may be deposited separately and in succession on the conveyor.

Therefore, another object of the invention is to provide in apparatus of the character described, a novel and improved construction and combination of means for holding a group of thin articles such as surgical blades in position to be individually removed from the group, and means for separating the articles one at a time from the group and depositing them in succession on a travelling conveyor.

Other objects, advantages and results of the invention will be brought out by the following description in conjunction with the accompanying drawings in which Figure 1 is a top plan view of a portion of the conveyor of a packaging machine of the type described, and apparatus for feeding surgical blades to the conveyor;

Figure 2 is a side elevation thereof approximately from the plane of the line 2—2 of Figure 1;

Figure 2A is a greatly enlarged detached perspective view of a magazine or holding rod for a group of blades to be fed to the packaging machine;

Figure 3 is a view similar to Figure 2 with the addition of a portion of the article transfer and packaging mechanism, with portions of the feeding apparatus and the packaging apparatus shown in vertical longitudinal section;

Figure 3A is a fragmentary vertical longitudinal sectional view approximately on the plane of the line 3A—3A of Figure 1 with the article feed slide in normal position prior to separating an article from the magazine;

Figure 4 is a greatly enlarged fragmentary vertical longitudinal sectional view similar to Figure 3A and showing the first step in the separation of an article from a magazine;

Figure 4A is a fragmentary vertical sectional view on the plane of the line 4A—4A of Figure 1;

Figure 5 is a similar view showing the next step in the movement of the article from the magazine to the conveyor of the packaging machine;

Figure 6 is a similar view showing the completion of the feeding of the article to said conveyor and with the feed slide returned to its normal position; and Figure 7 is a fragmentary perspective view of portions of the feed slide and the stripper bar.

Specifically describing the illustrated embodiment of the invention, the reference character A designates the main frame or casing of the packaging machine on which is mounted sealing mechanism B of generally known type, for example, such as shown in Patent No. 2,083,617, dated June 15, 1937, said sealing mechanism including two sealing rollers 1 mounted on and rotated in opposite directions by shafts 2 which are drivingly connected by gears, one of which may be driven by any suitable source of power. The rollers have complemental registering recesses 4 to provide clearance spaces between them for the articles, particularly surgical blades C between the layers or webs D of packaging material which are drawn by and between the rollers 1, the recesses being spaced circumferentially of the rollers and the rollers being rotated in timed relation to the deposit of the articles between the layers. In surrounding relation to the recesses 4 the peripheries of the rollers have serrated surfaces for crimping the layers of packaging material and the rollers may be heated in any suitable manner as by electric heaters 5 where the packaging material is of heat sealable type.

The articles C to be packaged are placed on a feeding conveyor E which carries the articles to a suction transfer member F which is operated in timed relation to the movement of the articles by the conveyor so that each article is lifted from the conveyor by the transfer member F and deposited between the layers of packaging material D, the articles being oriented and pushed from the suction transfer member by a pusher plate G, all as shown and described in Patent No. 2,653,434.

The conveyor E is shown as comprising a pair of parallel chains 6 mounted in known manner on sprockets one of which for each chain is denoted 7. On and between the chains 6 are mounted a plurality of spaced article carrying blocks 8 each of which has a pocket or recess 9 for at least one article C. The conveyor is driven by any suitable means continuously so as to bring the blocks with their respective articles into juxtaposition to the suction head 13 of the transfer mechanism F so that the latter may remove the article from the pocket.

The suction head 13 is pivotally connected to a suction pipe 14 which is connected in any suitable manner to a suitable suction producing apparatus and the suction head is swung up and down and simultaneously horizontally by an arm 15 which is pivotally connected at one end to the suction pipe 14 and is fast connected at its other end to a cam shaft journaled in the machine frame A actuated by a cam (not shown).

The pusher plate G may be formed of any suitable material that will not damage the articles, and the lower edge of the sheet will be shaped roughly to correspond to the shape of the article being packaged and is carried by a rod 16 vertically reciprocable in bearings 17 on the machine frame and carrying an arm 18 to which the pusher plate is connected; and the rod 16 is reciprocated by a cam and follower mechanism (not shown) which is actuated by any suitable source of power in timed relation to the movement of the transfer mechanism F and the conveyor E.

The feeding apparatus of the invention is preferably separable from and adjustably mounted on the upper surface of a table H forming a portion of the machine frame in which the conveyor E is mounted, and as shown, the feeding apparatus comprises two parallel rods 20 on and between which are mounted two parallel frame bars 21, the frame bars being adjustably secured to the rods as by set screws 22. The cross bars 21 are of sufficient length to span the conveyor E and have feet 23 at their opposite ends that are adjustable in the respective cross bars for leveling the apparatus on the table H. As shown, each foot comprises a disk having a central stud 24 that is slidably mounted in an opening 25 in the cross bar and is held in adjusted position by a set screw 26.

The two cross bars 21 are disposed in spaced and parallel relation to each other and one thereof has mounted thereon one or more article holders or magazines, and between the cross bars is mounted article depositing mechanism generally designated K.

As shown, there are two magazines or holders from each of which an article C is fed simultaneously with the feeding of an article from the other magazine or holder. Each magazine is shown as including a magazine strip 27 of suitable material, preferably metal, to nicely slidably fit an opening or slot 28 in each of the articles so that the articles may be threaded or slipped one after the other onto the strip and a group of the articles can be temporarily held in position on the strip by, for example, cotter pins or the like 29 removably inserted into perforations 30 in the strip as best shown in Figure 2A. The magazine strips 27 are separably mounted on a horizontal cross piece 31 that is secured on and supported between two posts 32 that rigidly project upwardly from the cross bar 21 that carries the magazines I. Mounted on the cross piece 31 for each of the magazine strips 27 is a clamp block 33 that has a groove 34 in the outer face thereof to snugly but removably receive one of the magazine strips 27, and cooperating with the clamp block 33 is a clamping plate 35 one end of which is fulcrumed on the clamp block and the other end of which is adapted to abuttingly overlie the exposed side of the magazine strip. A clamping screw 36 is threaded into the clamp block 33 and loosely passes through an opening in the clamping plate and has a head in abutting relation to the clamping plate for forcing the clamping plate into tight contact with the magazine strip so as to hold the latter firmly in adjusted position (Figures 1 and 3A).

Cooperating with the magazine strips is a combined article support and stripper plate L that is rigidly mounted on the cross piece 21 beneath the magazines I by angle brackets 37. In mounting the magazine strips loaded with groups of blades, the magazine strips are adjusted in the clamps 33, 35 so that the lower ends of the strips are spaced from a horizontal shelf 38 of the plate L a distance slightly greater than the thickness of one of the blades as shown in Figure 4, and initially the column or group of articles will rest on the shelf 38.

Cooperating with the support and stripper plate L is a feed plate M that is separably connected to an actuating plate N by cap screws 40 and positioning pins 41. The actuating plate has two upwardly projecting bearing portions 42 and 43 that are slidably mounted on a drive rod 44, and a cross head 45 is rigidly connected to the drive rod between the bearing portions 42 and 43. Interposed between the cross head 45 and the bearing portion 42 are compression springs 46 so that upon reciprocation of the drive rod 44, the feed plate will be correspondingly reciprocated but the feed plate may yield by virtue of the springs 46 in case it meets an obstruction such as a jammed blade during its feeding movement which is to the left in Figures 3A and 4. The feed plate is longitudinally slotted to provide a plurality of fingers 47 that are slidable in corresponding grooves 48 that open through the edge of said plate (Figures 4A and 7). The end portions of the fingers 47 at the leading edge of the feed plate are cut away as indicated at 49 to provide a shelf below the plane of the shelf 38 of the support and stripper plate L for momentarily supporting the articles as shown in Figure 5. At the inner ends of the cut away portions 49 are shoulders 50 for pushing the blades upon feeding movement of the feed plate in the direction indicated by the arrow in Figure 4, and the support and stripper plate L has a shoulder 38a for sliding the blades off the fingers 47 upon movement of the feed plate in the opposite direction.

The drive rod 44 and cross head 45 are reciprocated in timed relation to the movement of the conveyor E and as shown, a double acting reciprocating fluid pressure motor O has its piston rod rigidly connected to the cross head 45, and the motor is mounted on a plate P secured to the side rods 20 by clamps Q. The flow of fluid under pressure to and from the cylinder of the motor at opposite ends of the piston through pipes 51 is controlled by a reciprocating valve 52 which is in turn actuated alternately in opposite directions into rest and article-ejecting positions, respectively, by a spring and by a solenoid 53 energization of which is controlled by a microswitch 54 which is closed by the pusher rod 16 as the latter rises (Figures 1 and 3). Fluid is supplied to the valve 52 through a pipe 55 and is exhausted from the cylinder of the motor through a muffler 56.

In operation of the machine, a magazine strip loaded with a group of blades as shown in Figure 2A is inserted in each of the magazines I, the strips being properly adjusted so as to locate the lower ends thereof a distance above the shelf 38 of the support and stripper plate L slightly greater than the thickness of one of the blades (Figure 4). Preferably an abutment block 57 is mounted on the cross bar 21 adjacent the lower end of the magazine strip to be abutted by the blades as shown in Figure 4 to prevent flexing of the strip during feeding of the blades. It is desirable that the block 57 be formed of relatively soft material so as not to damage the edges of the blades and the block may be mounted on a plate 58 that is longitudinally adjustably mounted on the cross bar by cap screws 59.

Initially the parts will be in the positions shown in Figure 3 with the feed plate withdrawn to its normal retracted position to locate the shoulder 50 at the rear or righthand edges of the blades. Upon closing of the microswitch 54 and the energization of the solenoid 53, the valve 52 is actuated to energize the motor O and move the feed plate to the left in Figures 3, 4 and 4A, whereupon the shoulders 50 of the feed plate will engage the lowermost blade and push it to the left off the shelf 38 of the support plate L and onto the shelf 49 of the feed plate as shown in Figure 5. In the meantime, the conveyor E will have been moving so that one of the recesses 9 therein will be disposed below and adjacent the stripper shoulder 38a of the support plate. Thereupon, the motor O will be actuated in the opposite direction to retract the feed plate to the right into its normal position and the rear edge of the blade on the shelf 49 will abut the stripper shoulder 38a (Figure 5) of the stripper plate L so that the shelf 49 formed by the fingers of the feeding plate will be withdrawn from beneath the blade and thereby permit the latter to fall by gravity into said recess 9 as shown in Figure 6. This cycle of operation will then be repeated and the blades will be removed from the lower end of the column or group in succession and deposited into successive recesses 9 of the conveyor and then be conveyed to the suction head 13 which will remove them from the conveyor and deposit them between the packaging strips D preliminary to the sealing of the strips together by the sealing rolls B to enclose each blade in a compartment between the packaging strips as indicated at D' (Figure 3).

Should one of the blades become jammed or out of place at the lower end of the magazine strip, the springs 46 will yield to prevent damage to the machine, and in order to stop the reciprocation of the feed plate when desired, a latch lever 60 may be pivotally mounted at one end on a shaft 61 journaled in bearings 62 on the frame rods 20 and have a hooked end 63 to engage the bearing portion 43 of the feed plate and prevent movement of the bearing portion and the feed plate with the drive rod 44, the springs 46 yielding to permit movement of the cross head 45 relative to the bearing portion 42. A hand lever 64 may be provided for conveniently throwing the latch lever into and out of holding engagement with the bearing portion 43 of the feed plate. As shown in the drawings, the cross bar 21 has a groove 65 to provide a clearance for the latch lever and a stop arm 66 is provided in the cross bar to limit the upward movement of the latch lever. A torsion spring 67 may be provided for normally influencing the latch lever into inoperative position against the stop 66 as shown in the drawings.

While I have shown and described the invention as shown and described in certain structural details, it will be understood that this is primarily for the purpose of illustrating the now preferred embodiment of the invention and that many modifications and changes can be made in the construction of the apparatus within the spirit and scope of the invention.

What I claim is:

1. The combination with means for moving longitudinally two strips of packaging material in spaced opposed relation to each other and sealing between them thin flat articles having openings therethrough, a movable conveyor for the articles, and transfer mechanism including a reciprocable device for transferring said articles from the conveyor in succession and depositing them between said strips prior to the sealing of the strips together, of a frame above said conveyor, a magazine for a plurality of said articles including a vertical magazine strip on said frame to freely pass through the openings in a plurality of said articles for holding said articles in a vertical column, a horizontal support plate fixed on said frame above said conveyor to underlie the lowermost article in said column and spaced from the lower end of said magazine strip a distance slightly greater than the thickness of one of said articles, a feed plate horizontally slidably reciprocably mounted with respect to said support plate, said support plate and said feed plate being formed to coact to push the lowermost article from said column and to cause it to gravitationally drop onto said conveyor upon reciprocation of said feed plate in opposite directions, respectively, and means controlled by and upon reciprocation of said reciprocable device of the transfer mechanism for causing reciprocation of said feed plate.

2. The combination as defined in claim 1 with the addition of a table having portions at opposite sides of said conveyor, and wherein said conveyor has pockets spaced longitudinally thereof each to receive an article, and said frame is frictionally slidably mounted on said table portions to adjust said feed plate and support plate relatively to said pockets.

3. Apparatus for feeding to a horizontal portion of a packaging machine thin rigid articles having openings therethrough, including a frame, a magazine for a plurality of said articles including a vertical magazine strip on said frame above said horizontal portion of said machine to freely pass through said openings in a plurality of said articles for holding the articles in a vertical column, a horizontal combined support and stripper plate fixed on said frame to underlie the lowermost article in said column and spaced from the lower end of said magazine strip a distance slightly greater than the thickness of one of said articles, a feed plate horizontally slidably reciprocably mounted with respect to said support and stripper plate, said feed plate and said support and stripper plate being formed to coact to push the lowermost article from said column and to cause it to drop by gravity onto said horizontal portion of the packaging machine upon reciprocation of said feed plate in opposite directions, respectively, and means for causing reciprocation of said feed plate.

4. Apparatus as defined in claim 3 wherein the underside of said combined support and stripper plate has longitudinal grooves opening through one edge of the plate, said feed plate has a plurality of fingers each slidable in one of said grooves and disposed in a common horizontal plane with the other fingers to provide a shelf at the inner end of which is a shoulder for engaging and pushing the lowermost article in said column from the support and stripper plate onto said shelf upon movement of the feed plate in one direction, and the said support and stripper plate having a shoulder to abut the rear edge of said lowermost article and strip it from said shelf for deposit by gravity on said horizontal portion of the packaging machine upon movement of the feed plate in the opposite direction.

5. Apparatus as defined in claim 3 wherein said means for causing reciprocation of said feed plate includes a horizontal reciprocating drive rod having a crosshead thereon and reciprocable relatively to said support and stripper plate, upstanding bearing portions spaced apart on said feed plate and slidable on said drive rod at opposite sides of said crosshead and spring means between said crosshead and one of said bearing portions.

6. Apparatus as defined in claim 3 with the addition of means on said frame for removably clamping said magazine strip in vertical position on the frame adjacent the upper end of said strip, and abutment means on said frame to resist the pressure of the thrust of the feed plate on the lowermost article in said column.

7. Apparatus as defined in claim 6 wherein said support and stripper plate has a shoulder disposed at the side of said magazine strip opposite said abutment whereby the magazine strip with the column of articles thereon may be held against lateral movement in both directions between said abutment and said shoulder.

8. Apparatus as defined in claim 3 wherein said means for causing reciprocation of said feed plate includes a horizontal reciprocating drive rod having a crosshead thereon and reciprocable relatively to said support and stripper plate, upstanding bearing portions spaced apart on said feed plate and slidable on said drive rod at opposite sides of said crosshead, and spring means between said crosshead and one of said bearing portions, and with the addition of a latch lever pivotally mounted on said frame to engage one of said upstanding bearing portions and prevent movement of the feed plate in the direction to feed said articles.

9. Apparatus as defined in claim 3 wherein said means for causing reciprocation of said feed plate includes a horizontal reciprocating drive rod having a crosshead thereon and reciprocable relatively to said support and stripper plate, upstanding bearing portions spaced apart on said feed plate and slidable on said drive rod at opposite sides of said crosshead, and spring means between said crosshead and one of said bearing portions, and with the addition of a reciprocating fluid pressure motor connected to said drive rod, a valve for controlling flow of fluid to and from opposite sides of the piston of said motor, and means for actuating said valve to cause reciprocation of said drive rod.

10. Apparatus for feeding to a horizontal portion of a packaging machine thin rigid articles, including a frame, a magazine for a plurality of said articles on said frame above said horizontal portion of said machine for holding the articles in a vertical column, a horizontal combined support and stripper plate fixed on said frame to underlie the lowermost article in said column, a feed plate horizontally slidably reciprocably mounted with respect to said support and stripper plate, said feed plate and said support and stripper plate being formed to coact to push the lowermost article from said column and to cause it to drop by gravity onto said horizontal portion of the packaging machine upon reciprocation of said feed plate in opposite directions, respectively, and means for causing reciprocation of said feed plate, the underside of said combined support and stripper plate having longitudinal grooves opening through one edge of the plate, said feed plate having a plurality of fingers each slidable in one of said grooves and disposed in a common horizontal plane with the other fingers to provide a shelf at the inner end of which is a shoulder for engaging and pushing the lowermost article in said column from the support and stripper plate onto said shelf upon movement of the feed plate in one direction, and the said support and stripper plate having a shoulder to abut the rear edge of said lowermost article and strip it from said shelf for deposit by gravity on said horizontal portion of the packaging machine upon movement of the feed plate in the opposite direction.

References Cited in the file of this patent

UNITED STATES PATENTS

| | | |
|---|---|---|
| 867,834 | Neureuther | Oct. 8, 1907 |
| 1,512,430 | Loy | Oct. 21, 1924 |